United States Patent
Gras et al.

(10) Patent No.: US 6,751,543 B2
(45) Date of Patent: Jun. 15, 2004

(54) METHOD, COMPUTER PROGRAM, AND CONTROL SYSTEM FOR OPERATING A MOTOR VEHICLE HAVING AN INTERNAL COMBUSTION ENGINE

(75) Inventors: Juergen Gras, Bietigheim-Bissingen (DE); Ralf Klein, Bad Wimpfen (DE); Thomas Edelmann, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 09/975,035

(22) Filed: Oct. 10, 2001

(65) Prior Publication Data

US 2002/0072844 A1 Jun. 13, 2002

(30) Foreign Application Priority Data

Oct. 10, 2000 (DE) .......................................... 100 49 908

(51) Int. Cl.⁷ ................................................ B60T 7/12
(52) U.S. Cl. .................. 701/103; 701/111; 123/406.29
(58) Field of Search ................................. 701/103, 104, 701/105, 107, 111, 114, 115, 30, 35; 123/406.29; 73/35

(56) References Cited

U.S. PATENT DOCUMENTS

| | | | | |
|---|---|---|---|---|
| 4,700,677 A | * | 10/1987 | Bonitz et al. | 123/406.16 |
| 5,076,235 A | * | 12/1991 | Nagel et al. | 123/406.33 |
| 5,184,301 A | * | 2/1993 | Stasell | 701/110 |
| 5,647,317 A | * | 7/1997 | Weisman et al. | 123/299 |
| 5,732,676 A | * | 3/1998 | Weisman et al. | 123/436 |
| 5,791,316 A | * | 8/1998 | Houtz et al. | 123/491 |
| 5,909,723 A | * | 6/1999 | Ichimoto et al. | 123/406.19 |
| 5,999,876 A | * | 12/1999 | Irons et al. | 701/115 |

FOREIGN PATENT DOCUMENTS

DE 28 00 433 7/1979

* cited by examiner

Primary Examiner—Willis R. Wolfe
Assistant Examiner—Johnny H. Hoang
(74) Attorney, Agent, or Firm—Kenyon & Kenyon

(57) ABSTRACT

A method for operating a motor vehicle having an internal combustion engine. In the method, the operation of the motor vehicle is influenced as a function of at least one operating parameter determined during an operating time of the motor vehicle. In order to take wear and tear of the motor vehicle and the internal combustion engine into consideration, an operating parameter suitable for determining wear and tear of the motor vehicle is detected, a value corresponding to the wear and tear is determined, and the operation of the motor vehicle is adjusted according to the determined value.

18 Claims, 2 Drawing Sheets

METHOD, COMPUTER PROGRAM, AND CONTROL SYSTEM FOR OPERATING A MOTOR VEHICLE HAVING AN INTERNAL COMBUSTION ENGINE

FIELD OF THE INVENTION

The present invention relates to a method for operating a motor vehicle having an internal combustion engine, in which the operation of the motor vehicle is influenced depending on at least one operating parameter determined during an operating time of the motor vehicle.

BACKGROUND INFORMATION

German Patent No. 28 00 433 describes determining the total distance traveled by the motor vehicle and/or the total operating time of the motor vehicle. In this method, a limit speed of the internal combustion engine is changed depending on the total distance traveled and/or the total operating time in such a way that during a breaking-in period, only a relatively low speed of the internal combustion engine is possible. Overrevving of the internal combustion engine during the breaking-in period is to be prevented in this way.

SUMMARY OF THE INVENTION

However, it is problematic in the known method that with it the motor vehicle can nonetheless not always be operated optimally. The present invention therefore has as its object the refinement of a method of the type initially cited so that the motor vehicle can be operated as optimally as possible over its entire service life.

This object is achieved in a method of the type initially cited in that an operating parameter suitable for determining wear and tear of the motor vehicle is detected, a value corresponding to the wear and tear is determined, and the operation of the motor vehicle is adjusted according to the value determined.

According to the present invention, wear and tear is understood as the deterioration of an initially optimum state of the motor vehicle or its components due to wear or other reasons. It is thus possible with the method according to the present invention to respond to wear and tear which is unavoidable in the course of the life of the motor vehicle and to take appropriate measures which allow operation of the motor vehicle corresponding to the state of wear and tear. In this way, on one hand, the service life of the motor vehicle and its components is lengthened and, on the other hand, for example, emission mileage, fuel consumption, and comfort during operation of the motor vehicle are improved.

Thus, it is suggested that with increasing wear and tear, bucking of a drive train is prevented and/or counteracted through an appropriate change of at least one control parameter of the internal combustion engine. Particularly in motor vehicles having rear wheel drive, in the course of the life of the motor vehicle, the drive train, especially the drive shaft, becomes softer around its circumference due to the repeated and/or constantly occurring torsional stresses. Through the detection of wear and tear according to the present invention, this type of softening of the drive train can be deduced and bucking caused by a soft drive train can be prevented and/or counteracted through appropriate measures, e.g., control interventions in the transmission or the internal combustion engine itself.

In an embodiment of the present invention, it is further suggested that a knock detection threshold of the internal combustion engine be set higher with increasing wear and tear. Thus, for example, a new internal combustion engine is quieter than an old, worn out internal combustion engine. This can be detected and the changed combustion behavior can be appropriately counteracted by an intervention, e.g., in the ignition point.

In another refinement of the method according to the present invention, the ignition angle of the internal combustion engine is delayed with increasing wear and tear. This measure is based on the knowledge that in older, worn out internal combustion engines, deposits are present which make optimum combustion of the fuel more difficult with an early ignition angle, which is favorable per se for other reasons. Among other things, this results in older internal combustion engines no longer having optimum emission mileage. This is countered by delaying the ignition angle of the internal combustion engine.

If necessary, a threshold, above which a diagnostic unit infers a fault of a part of the motor vehicle, can be set higher with increasing wear and tear. Through this measure, the fact is taken into account that in the course of the life of a motor vehicle, for example, specific parts have greater play, due to vibrations, without a malfunction or an expected malfunction of the part having to be inferred due to this play. On the other hand, this type of greater play would not be acceptable in a new vehicle. This is taken into consideration according to the present invention in that a corresponding diagnostic unit operates "more tolerantly" with increasing wear and tear.

It is also particularly preferred in the method according to the present invention if the amount of change of the operating parameter is detected. From this, additional information about the load of the motor vehicle can be obtained and conclusions can in turn be drawn from this about the wear and tear of the motor vehicle.

A further preferred refinement of the method according to the present invention is that the operating parameter is integrated. In this way, a value relevant for wear and tear over the service life of the motor vehicle is provided in a simple way.

Examples of these types of integrated operating parameters are the mileage of the motor vehicle, the number of crankshaft rotations and the number of drive shaft rotations of the internal combustion engine. These operating parameters can be obtained easily in all motor vehicles having an internal combustion engine.

Furthermore, it is possible that the integrated operating parameter is the operating temperature of the internal combustion engine, preferably integrated over the operating period and/or the number of crankshaft rotations and/or the mileage of the motor vehicle. In this way, it can, for example, be recognized whether the internal combustion engine is frequently operated in the unfavorable cold operating state, which allows inference of greater wear and tear and of a specific type of wear and tear.

Furthermore, the operating parameter can be an acceleration, preferably along the longitudinal axis of the vehicle. This allows, for example, conclusions about the wear and tear of the drive train to be drawn.

In the course of the service life of a motor vehicle, deposits occurring in the internal combustion engine, and particularly in the combustion chamber and/or in the intake passage, can preferably also be recognized directly by appropriate sensors or during an inspection. A corresponding operating parameter is then formed from this, on whose basis corresponding interventions then occur, e.g., in the course of engine management.

The present invention also relates to a computer program which is suitable for performing the previously described method when it is executed on a computer. It is particularly preferable in this case if the computer program is stored in a memory, particularly in a flash memory.

Finally, the present invention also relates to a control system for operating a motor vehicle having an internal combustion engine, having at least one sensor with which an operating parameter of the motor vehicle is determined and having a control unit which influences the operation of the motor vehicle depending on the operating parameter determined.

In order to be able to operate the motor vehicle optimally during its entire service life, it is suggested according to the present invention that the sensor detect an operating parameter suitable for determining wear and tear of the motor vehicle and the control unit determine a value corresponding to the wear and tear and adjust the operation of the internal combustion engine to the determined value. This type of control system has the advantage that, with it, the motor vehicle can be operated essentially optimally over its entire service life.

DETAILED DESCRIPTION

Figure 1:
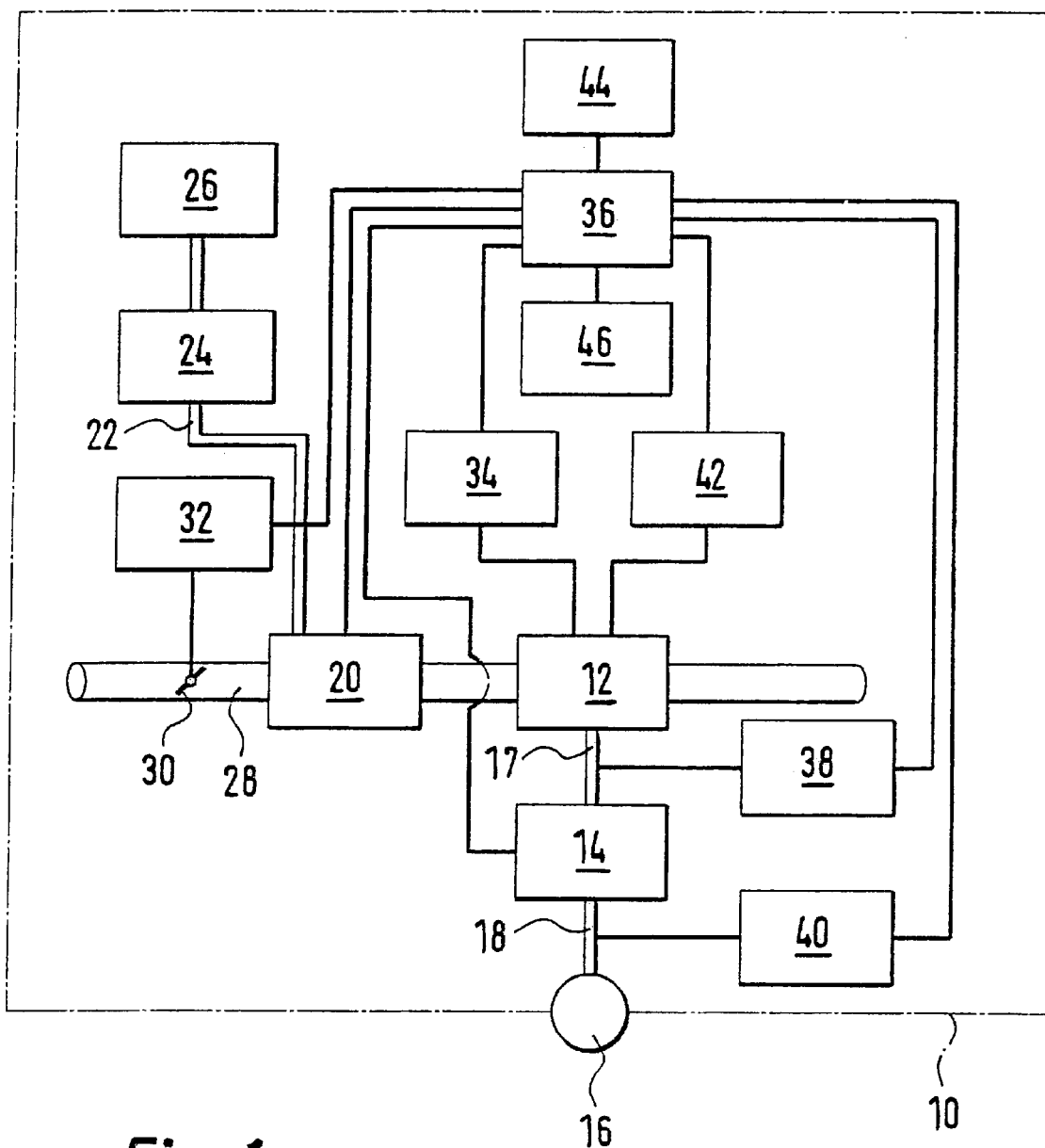
FIG. 1 shows a block diagram of a motor vehicle.

In FIG. 1, a motor vehicle shown only schematically by a dot-dash line bears the reference number 10 as a whole. It includes an internal combustion engine 12, which drives wheels 16 via a transmission 14. The power is transmitted from internal combustion engine 12 via a crankshaft 17 to transmission 14 and from transmission 14 to wheels 16 via a drive shaft 18. It should be noted at this point that in the present case the term "internal combustion engine" is essentially understood to mean the engine block having the combustion chambers, pistons, etc., which are not shown in detail.

Valves 20 are located upstream from the combustion chambers of internal combustion engine 12 which are connected via a fuel line 22 to a fuel pump 24, which is supplied with fuel from a tank 26. The air for combustion is supplied to internal combustion engine 12 through intake manifold 28, in which a throttle valve 30 is located, which is in turn operated via a positioning motor 32. Spark plugs (not shown) of internal combustion engine 12 are supplied by an ignition device 34.

Motor vehicle 10, internal combustion engine 12, and the corresponding components are operated using a control unit 36, which receives signals from various sensors: first, it receives signals from a crankshaft sensor 38, which detects the speed of crankshaft 17. Furthermore, a sensor 40 is provided which detects the speed of drive shaft 18 and relays corresponding signals to control unit 36. In addition, a temperature sensor 42 is provided which detects the operating temperature of internal combustion engine 12. Corresponding signals are supplied by temperature sensor 42 to control unit 36. An acceleration sensor 44 detects accelerations in the direction of travel and is connected in an appropriate way to send signals to control unit 36. Finally, a clock 46 is also provided, which supplies corresponding time signals to control unit 36.

The signals of crankshaft sensor 38, drive shaft sensor 40, temperature sensor 42, and acceleration sensor 44 are integrated over time in control unit 36 and a corresponding value for the wear and tear of motor vehicle 10, and particularly of internal combustion engine 12, is determined from this. Depending on the determined value, positioning motor 32, valves 20, ignition 34, and/or transmission 14 are appropriately driven by control unit 36 to ensure optimum operation of motor vehicle 10 and internal combustion engine 12 according to the wear and tear determined.

Figure 2:
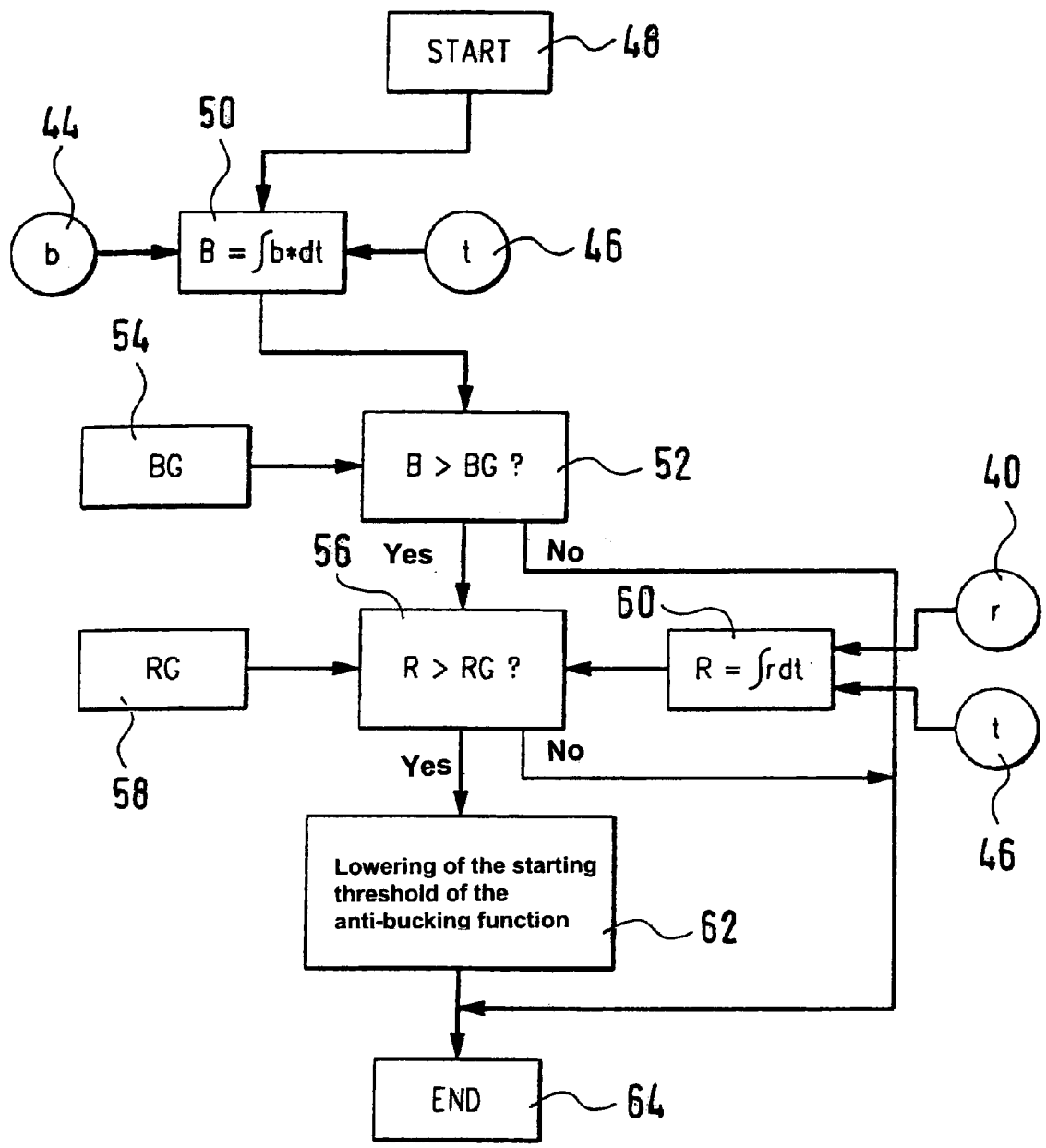
FIG. 2 shows a simplified flowchart for the operation of the motor vehicle from FIG. 1.

An example of this type of consideration of the wear and tear of internal combustion engine 12 during its operation is shown in FIG. 2:

The method shown here begins in a start block 48. In an integrator 50 that follows, acceleration b measured by acceleration sensor 44 is integrated over operating time t of internal combustion engine 12 measured by clock 46 to form an acceleration value B. This acceleration value B is compared in block 52 with a limit value BG, which is stored in a limit value memory 54. If acceleration value B is above limit value BG, this is a sign that stressing acceleration maneuvers of motor vehicle 10 were frequently performed on the drive train, and in this case particularly on drive shaft 18.

If the answer in block 52 is "yes", a total number of rotations R of drive shaft 18 is compared in block 56 with a limit value RG which is stored in a limit value memory 58. The total number of rotations R of drive shaft 18 is integrated in a block 60 from rotation speed r provided by drive shaft sensor 40 and operating time t provided by clock 46.

If total number of rotations R of drive shaft 18 is greater than limit value RG, i.e., if the answer in block 56 is "yes", the starting threshold of an anti-bucking function is lowered in block 62.

Through this measure, consideration is taken of the fact that with frequently occurring accelerations and therefore strong torsional stresses on drive shaft 18, and with a higher total number of rotations of drive shaft 18 overall, its torsional stiffness is reduced and an undesirable bucking can occur from this, particularly during acceleration of motor vehicle 10. Through electronic interventions in internal combustion engine 12 (e.g., in the fuel metering and the ignition point), this type of bucking can be prevented. This is what is meant by the term "anti-bucking function."

The method shown in FIG. 2 ends in an end block 64. A jump to this end block 64 from block 52 and/or 56 also occurs if the answers to the comparison performed in these cases are each "no."

The operating temperature of the internal combustion engine can also be used in block 50 as the parameter for wear in place of or additionally to the acceleration of the motor vehicle and/or the total number of drive shaft rotations, integrated over the operating time, and compared in block 52 with a limit value. The length of the total distance covered by the motor vehicle or the layer thickness of deposits present in the combustion chamber can also be used for the comparison in block 52. Furthermore, the use of a characteristic curve or a characteristic map in place of the use of a limit value is also conceivable.

Furthermore, limit value BG in block 54 could, for example, be influenced by the rate at which the wear occurs. For this purpose, the amount of change in the operating parameter is detected.

Finally, a knock detection threshold could be increased or the ignition angle could be delayed in block 62 to take into consideration the change in the combustion chamber during the course of the life of internal combustion engine 12.

What is claimed is:

1. A method of operating a motor vehicle having an internal combustion engine, comprising the steps of:
    determining at least one operating parameter during an operating time of the motor vehicle;
    influencing an operation of the motor vehicle as a function of the at least one operating parameter;
    detecting an operating parameter suitable for determining a wear and tear of the motor vehicle;
    establishing a value corresponding to the wear and tear; and
    adjusting the operation of the motor vehicle according to the value corresponding to the wear and tear, wherein, with an increase in the wear and tear, a threshold above which a diagnostic unit concludes there is a fault in a part of the motor vehicle is elevated.

2. The method according to claim 1, further comprising the step of:
    at least one of preventing and counteracting a bucking of a drive train as a result of an increase in the wear and tear through an appropriate change of at least one control parameter of the internal combustion engine.

3. The method according to claim 1, further comprising the step of:
    elevating a knock detection threshold of the internal combustion engine with an increase in the wear and tear.

4. The method according to claim 1, further comprising the step of:
    delaying an ignition angle of the internal combustion engine with an increase in the wear and tear.

5. The method according to claim 1, further comprising the step of:
    detecting an amount of change in the operating parameter suitable for determining the wear and tear.

6. The method according to claim 1, further comprising the step of:
    integrating the operating parameter suitable for determining the wear and tear to produce an integrated operating parameter.

7. The method according to claim 6, wherein:
    the integrated operating parameter is a mileage of the motor vehicle.

8. The method according to claim 6, wherein:
    the integrated operating parameter is at least one of a number of crankshaft rotations and a number of drive shaft rotations of the internal combustion engine.

9. The method according to claim 6, wherein:
    the integrated operating parameter is an operating temperature of the internal combustion engine.

10. The method according to claim 9, wherein:
    the integrated operating parameter corresponding to the operating temperature of the internal combustion engine is integrated over at least one of the operating time of the motor vehicle, a number of crankshaft rotations, and a mileage of the motor vehicle.

11. The method according to claim 6, wherein:
    the integrated operating parameter is an acceleration.

12. The method according to claim 11, wherein:
    the acceleration is along a longitudinal axis of the vehicle.

13. The method according claim 1, further comprising the steps of:
    recognizing a deposit; and
    forming from the deposit a corresponding operating parameter.

14. The method according to claim 13, wherein:
    the deposit is in at least one of a combustion chamber and an intake passage.

15. A computer program for causing a computer to perform the steps of:
    determining at least one operating parameter during an operating time of a motor vehicle;
    influencing an operation of the motor vehicle as a function of the at least one operating parameter;
    detecting an operating parameter suitable for determining a wear and tear of the motor vehicle;
    establishing a value corresponding to the wear and tear; and
    adjusting the operation of the motor vehicle according to the value corresponding to the wear and tear, wherein, with an increase in the wear and tear, a threshold above which a diagnostic unit concludes there is a fault in a part of the motor vehicle is elevated.

16. The computer program according to claim 15, wherein:
    the computer program is stored in a memory.

17. The computer program according to claim 16, wherein:
    the memory includes a a flash memory.

18. A control system for operating a motor vehicle having an internal combustion engine, comprising:
    at least one sensor with which an operating parameter of the motor vehicle is determined; and
    a control unit for influencing an operation of the motor vehicle depending on the determined operating parameter, wherein:
    the at least one sensor detects an operating parameter suitable for determining a wear and tear of the motor vehicle, and
    the control unit determines a value corresponding to the wear and tear and adjusts the operation of the motor vehicle according to the determined value, whereby, with an increase in the wear and tear, a threshold above which a diagnostic unit concludes there is a fault in a part of the motor vehicle is elevated.

* * * * *